United States Patent
Hoang (10) Patent No.: US 12,356,966 B1
(45) Date of Patent: Jul. 15, 2025

(54) MODULAR FISH TANK FILTER COMPONENTS

(71) Applicant: Dung Minh Hoang, Cumberland, MD (US)

(72) Inventor: Dung Minh Hoang, Cumberland, MD (US)

( * ) Notice: Subject to any disclaimer, the term of this patent is extended or adjusted under 35 U.S.C. 154(b) by 415 days.

(21) Appl. No.: 18/152,844

(22) Filed: Jan. 11, 2023

Related U.S. Application Data (60) Provisional application No. 63/316,917, filed on Mar. 4, 2022.

(51) Int. Cl.
*A01K 63/04* (2006.01)
*B01D 25/02* (2006.01)
*C02F 3/00* (2023.01)

(52) U.S. Cl.
CPC .......... *A01K 63/045* (2013.01); *B01D 25/02* (2013.01); *C02F 3/00* (2013.01)

(58) Field of Classification Search
CPC .. A01K 63/045; B01D 24/007; B01D 24/008; B01D 27/146; B01D 27/148; B01D 25/02; B01D 29/56; B01D 29/58; C02F 3/00
USPC ......... 210/167.21, 167.22, 167.25, 150, 151, 210/232, 416.2; 119/259, 260
See application file for complete search history.

(56) References Cited

U.S. PATENT DOCUMENTS

| | | | | |
|---|---|---|---|---|
| 4,024,064 A | * | 5/1977 | Rakowicz | B01D 35/06 210/416.1 |
| 5,026,477 A | * | 6/1991 | Yen | C02F 1/325 210/167.25 |
| 5,693,220 A | * | 12/1997 | Sceusa | A01K 63/042 119/268 |
| 2004/0182767 A1 | * | 9/2004 | Patron | C02F 3/04 210/221.2 |
| 2006/0049086 A1 | * | 3/2006 | Axelrod | A01K 63/045 210/167.22 |
| 2016/0330942 A1 | * | 11/2016 | Huntley | C02F 1/28 |

FOREIGN PATENT DOCUMENTS

CN 103492053 A * 1/2014 .......... B01D 63/081

OTHER PUBLICATIONS

Machine-generated English translation of CN 103492053, generated on Apr. 24, 2027.*

* cited by examiner

*Primary Examiner* — Fred Prince
(74) *Attorney, Agent, or Firm* — Karen Tang-Wai Sutton (57) ABSTRACT

A modular filtration assembly for a fish tank, the assembly having one or more identical modules with a filter material receiving chamber, and complementary couplers on a front and back of each module where the couplers on the back of a module couple with the couplers on the front of an immediately adjacent module. The back is slotted to allow water to flow through the module. The assembly includes a buffer module that couples to a pump on one side and to an immediately adjacent module on an opposite side. The one or more modules or the buffer module may include an L-shaped lip sized and shaped so as to create a recessed mating structure allowing an immediately adjacent module to further couple to the buffer module or to another module. The front-back couplings are maintained during pump operation by water pressure from the pump.

16 Claims, 11 Drawing Sheets

MODULAR FISH TANK FILTER COMPONENTS

CROSS-REFERENCE TO RELATED APPLICATIONS

This application is a utility of U.S. patent application Ser. No. 63/316,917 filed Mar. 4, 2022, from which priority and benefit is claimed under all applicable sections of Title 35 of the United States Code including, but not limited to, Sections 120, 121, and 365 (c), and which in its entirety is incorporated by reference into this application.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to filtration systems for fish tanks, ponds and other standing bodies of water. More specifically, the invention is an improved modular filtration system with interchangeable modular filter components allowing the system to be scaled according to volume of water filtered per hour as well as customized to accommodate specific filtering needs such as single filtering using mechanical filters.

Background Art

Fish tanks are contained artificial aquatic systems designed to mimic a natural aquatic environment. Unlike the natural aquatic system, whose water quality is maintained through natural means, a fish tank requires significant mechanical, biological, and chemical filtration to maintain the cleanliness of its relatively small quantity of water to maintain fish and plant health as well as to keep the water clear and attractive.

Given the popularity of fish as pets, many fish tank filtration systems exist on the market, including fully submersible systems as well as exterior, waterfall types that hang onto the side of the fish tank. A typical filtration assembly has an electric water pump that pulls water from the tank and into the filter, where the water passes through a variety of filter media to clean the water before returning to the tank. The filter media in a simple fish tank filter is comprised of a removable cartridge having a quantity of charcoal inside a fibrous pad supported by a plastic frame. The cartridge fits into a slot formed inside the filter chamber, where dirty water passes through one side of the filter and exits the other side, presumably now clean when it returns to the fish tank, where the returning water is also typically aerated for further water health. The fish tank owner can choose between a number of different off the shelf cartridges according to the primary type of filtration sought, but in reality, most cartridges are designed to provide a combination of mechanical, chemical and biological filtration in a single cartridge. When this general level of filtration is unsatisfactory, the fish tank owner can purchase a cartridge with a finer mechanical filtration component, for instance, but still the cartridge is typically a combination of mechanical, chemical and biological filtration. Some types of fish tank filtration systems combine two separate filtering components, such as a cartridge with a sponge so as to divide the filtering components, however current fish tank filtering systems provide the fish tank owner limited ability to customize the filtration system according to need.

Filtration systems are selected in part by the size of the pump and the amount of water capable of being filtered by the hour. Larger tanks will require larger pumps in order to properly maintain water quality, and filtration systems having a single pump are not easily scalable up or down as needed. Typically, a new filtration system with a pump with a larger capacity is required for a larger tank, and a smaller tank similarly will need a smaller system as over filtration of the water is not necessarily desirable, and sizing of pumps according to volume of water in the tank is known in the prior art. Filtration systems, while often modular in that there is a filter chamber housing at least one or more mechanical, biological and chemical filter materials, have filter systems that are not easily modified to scale up or down, or be otherwise customized if a fish tank owner wants to increase or decrease filter material types. For instance, when fish are sick, medication is dosed into the water and it is best to remove chemical filtration from the tank to ensure adequate dosing, yet the cartridge system combining mechanical, chemical and biological filters in one, poses a quandary to the fish owner. Does the fish owner remove all filtration by removing the entire cartridge or deal with less efficacious medicine dosing but continuing to filter the water with all three types of filtering? Similarly, chemical and mechanical filtration require replacement from time to time, yet an all-in-one cartridge means that biological filtration is lost when the old cartridge is replaced with a new one. Many new fish owners dutifully do water changes and unwittingly kill their fish by removing the biological filtration when replacing an old filter cartridge with a new one, all while following the filter maker's instructions on maintaining water health.

What is needed is a filtration system for a fish tank that is modular and easily scalable to suit the specific application needs. What is also needed is a filtration system where components of the system are easily removed, rearranged and replaced with minimal disruption to fish living in the tank and stoppage of water filtration during maintenance.

DISCLOSURE OF INVENTION

A modular filtration assembly for a fish tank, comprising a first module having a front and a slotted back in spaced apart relationship defining a filter chamber. A front coupler is affixed to the front, and a back coupler is affixed to the back of the first module. The front is further formed with a front opening so as to allow access into the filter chamber.

A buffer module similarly has a front with a front coupler and a buffer opening leading to an internal chamber within the buffer module, the front coupler of the buffer module positioned to mate with the back coupler of the slotted back of the first module. The buffer has a buffer back with a pipe coupler formed therein, allowing water entering the front opening to pass through the slotted back of the first module, into the buffer opening and out through the pipe coupler of the buffer module. The chamber of the first module is adapted to receive a quantity of filter material selected from the group of filter materials including chemical, biological, and mechanical materials. Multiple modules are coupled together by mating the back coupler of the first module to the front coupler of a second module and so forth, with the buffer module serving as a last module affixed to a pump.

In a second aspect of the invention, the front coupler is a magnet or a ferromagnetic metal and the back coupler is a magnet or a ferromagnetic metal that will mate with the front coupler.

In yet a third aspect of the invention, the first and second modules are additionally formed with a pair of projecting collars on at least a portion of a perimeter of each module and on opposed sides of the front and back of the modules, such that when the back of the first module is immediately adjacent the front of the second module the projecting collars are aligned and can be affixed to one another by one or more pressure-fitted clips.

In yet a fourth aspect of the invention, the back of each module or buffer is formed with an L-shaped lip so as to create a recess portion sized and shaped to mechanically mate with the front of an immediately adjacent module by positioning the front of the immediately adjacent module inside the L-shaped lip.

In yet a fifth aspect of the invention, an exterior of the first module, the buffer module and the second module share a same shape and dimension.

In yet a sixth aspect of the invention, the chamber of at least one module is sized shaped to receive at least two filter materials.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

The following is a list of reference labels used in the drawings to label components of different embodiments of the invention, and the names of the indicated components.

100 modular filter assembly or assembly
10 filter module or module
10a upper end
10b lower end
10c front opening
12 front side or front
12a front flange or flange
14 back side or back
14a slotted back
16 front coupler
18 back coupler
20 pump
20a pump intake
20b pump outflow
22 buffer module
22a buffer end
22b pump end
22d pipe coupler
22e buffer front
22ee buffer opening
22f buffer back
24 intake end
26 pipe or fitting or connector or tube
30 fish tank or tank
50 coarse filter material
52 fine filter material
54 terminal module
54a lip
54b biological filter material
54c projecting collar 54d clip
56 mechanical filter module
58 chemical filter material

DETAILED DESCRIPTION

A modular filter assembly or assembly according to the invention 100 having a plurality of modular filter components and an optional buffer module 22 used with a pump 20 and a fitting or connector or pipe 26 attaching the pump 20 to the assembly 100 is shown in FIGS. 1-13, where a representative embodiment of the modular filter assembly 100 for a fish tank or tank 30 is shown, and some representative methods of using the modular components are shown in FIGS. 8-15.

Figure 1:
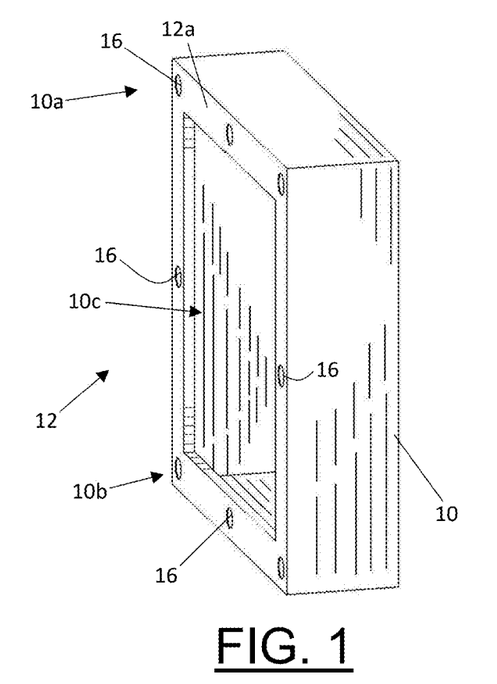
FIG. 1 is a first embodiment of a single filter module shown without a filter insert according to the invention, shown in a front perspective view.
Figure 2:
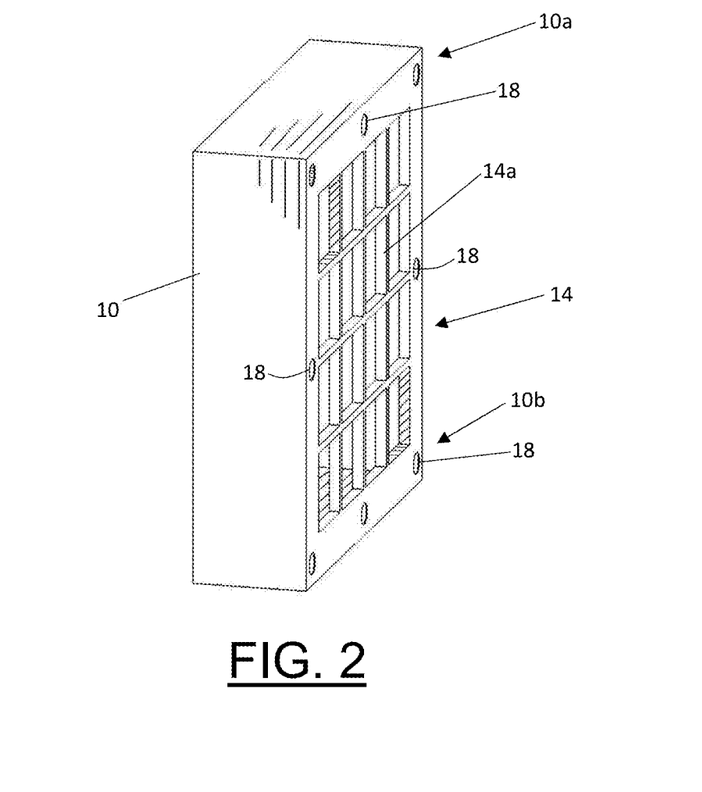
FIG. 2 is a back perspective view of the single filter module in FIG. 1.

In FIGS. 1 and 2, a single filter module or module 10 is shown empty, that is, without a filter insert. The module 10 is comprised of a body having a front side or front 12 with a front opening 10c framed by a continuous front flange or flange 12a formed around the front 12, and an upper end 10a and a lower end 10b. A plurality of front couplers 16 are disposed on the upper end 10a and the lower end 10b of the front 12. The module 10 is further comprised of a back side or back 14 formed with a slotted back 14a portion having a plurality of slots sized and shaped to allow a flow of water entering the module 10 through the front opening 10c to exit the module 10 through the slotted back 14a. A plurality of back couplers 18 are disposed on the respective upper end 10a and the lower end 10b of the back 14 and positioned such that when the front couplers 16 of a second module 10 are positioned immediately adjacent the back couplers 18 of a first module 10, the front and back couplers 16 18 are removably mateable and when mated hold the first and second modules together. Thus, the front 12 and back 14 of the module 10 are in spaced apart relationship, defining a chamber within the module 10 sized and shaped to receive a quantity of filter material that is housed within the module 10.

Figure 3:
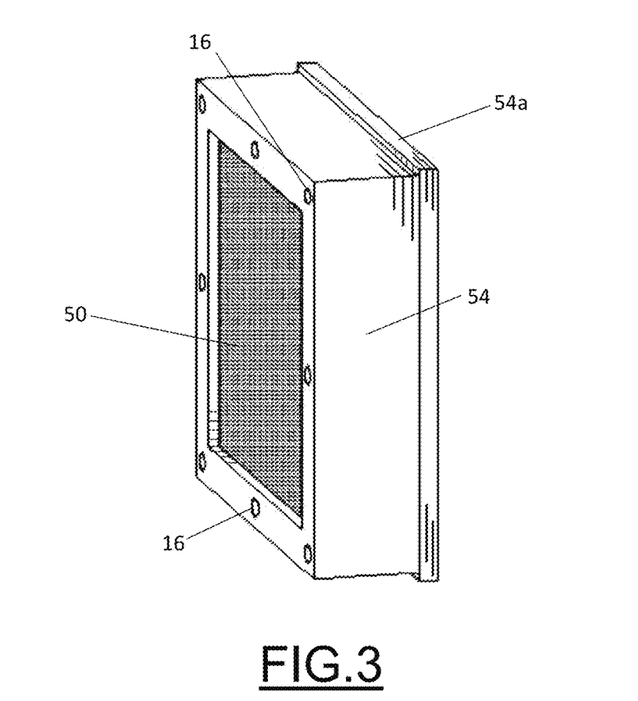
FIG. 3 is a front perspective view of a terminal filter module according to the invention.
Figure 4:
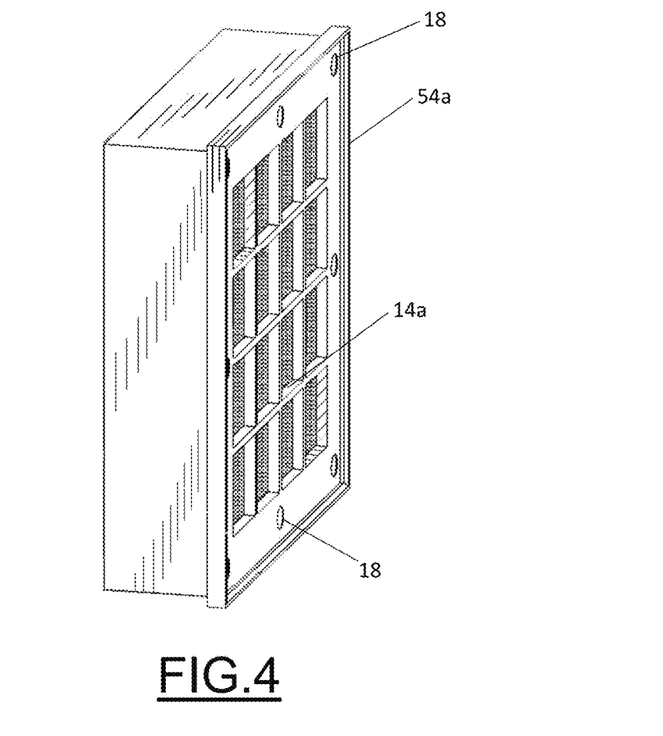
FIG. 4 is a back perspective view of the terminal filter module in FIG. 3.

Turning to FIGS. 3-4, a terminal module 54 is shown configured with a biological filter material 54b so as to serve a biological module. The terminal module 54, like the other modules, can be configured with any desired filter material, such as a coarse mechanical filter, and shares all features of the filter module 10 except for a lip 54a formed about a perimeter of the back 14 of the terminal module 54, hence the inventor stresses that the biological filter material 54b in the terminal module 54 is a representative embodiment only. The lip 54a both protrudes and extends away from the back 14, so as to jut outwards from the body of the terminal module 54 and protrude from the back 14 so as to create a shallow recessed area between the lip 54a and the slotted back 14a, the recessed area sized and shaped to receive a front 22e of the buffer module 22. The lip 54a thus is L-shaped. The recessed area created by the lip 54a works in conjunction with the couplers 16 18 to hold the buffer module 22 to the terminal module 54 and the recessed area further prevents the modules 22 54 from being separated by twisting or other mechanical manipulation of the modules 10 22 54 of the assembly 100.

Figure 8:
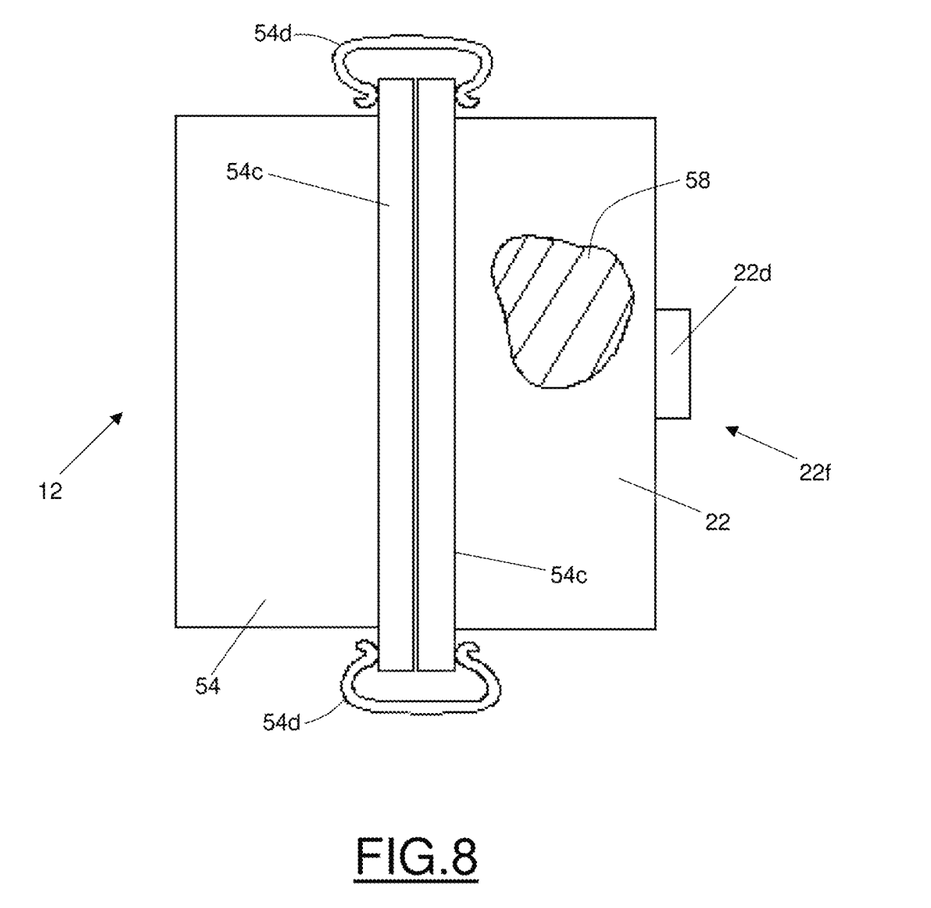
FIG. 8 is a side elevation view of one filter module coupled to the buffer module and shown in a use position.
Figure 9:
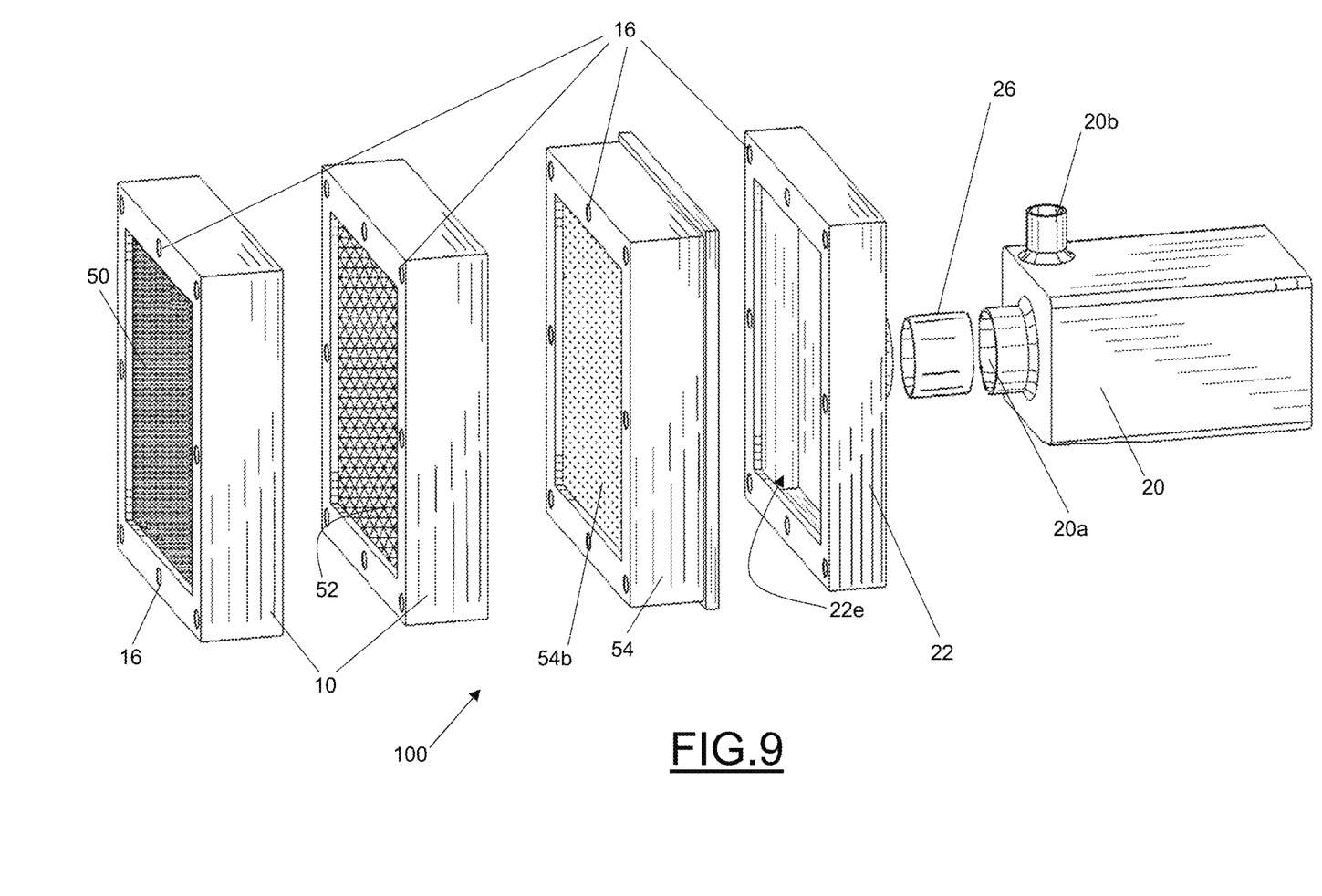
FIG. 9 is an exploded view of the plurality of filter modules and the buffer module in a representative embodiment, shown in a front perspective view, where the representative embodiment is shown in a representative arrangement with selected filter materials.

The inventor notes that the use of the lip 54a to couple the terminal module 54 to the buffer module 22 in the representative embodiment in the FIGS. is a first embodiment of a coupling structure designed to further mechanically mate the modules 54 22 together. A second embodiment in FIG. 8 shows a projecting collar 54c extending away from the back 14 of the terminal module body and a second projecting collar 54c extending away from the front 12 of the buffer module 22, the projecting collars 54c disposed such that when the terminal module 54 and the buffer module 22 are mated, the projecting collars 54c align and then can be mechanically connected using one or more removable clips 54d along the projecting collars 54c, as desired. FIG. 8 shows the clips 54d clamping the projecting collars 54c together at the upper 10a and lower 10b ends of the terminal module 54 and the buffer module 22, however the clips 54d or other suitable mechanical fasteners can be positioned anywhere along the immediately adjacent projecting collars 54c to hold them together. The projecting collars 54c can also be configured as discreet tabs extending away from the modules rather than the continuous collars shown in the FIGS.

Figure 5:
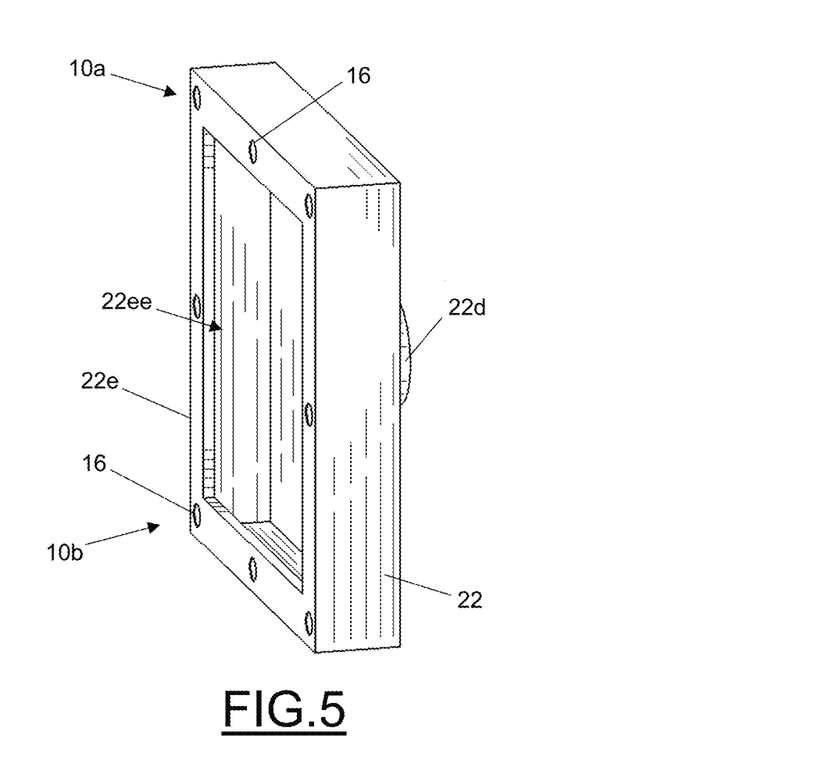
FIG. 5 is a front perspective view of a buffer module according to the invention.
Figure 6:
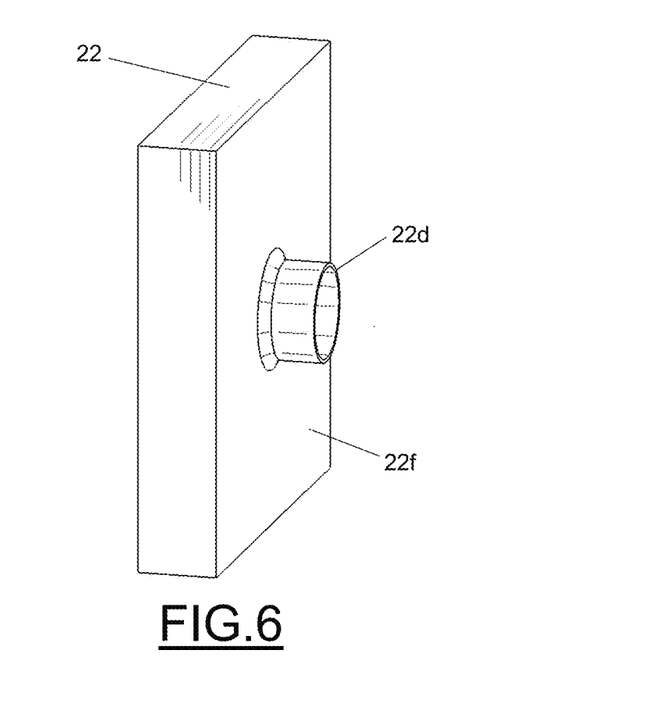
FIG. 6 is a back perspective view of the buffer module in FIG. 5.

FIGS. 5-6 show the front 22e and back 22f of the buffer module 22 for the representative embodiment in FIGS. 1-11. The buffer module 22 includes front couplers 16 disposed on the front flange 22e, a buffer opening 22ee through which water enters the buffer module 54, and the back 22f as a solid wall having a pipe coupler 22d disposed as an opening with a perimeter wall extending away from the back 22f of the buffer module 22 through which water exits. A pipe 26 having a buffer end 22a joins the pipe coupler 22d to the pipe 26, and at an opposed end, the pipe 26 attaches to a pump intake 20a of the pump 20 at a pump end 22b of the pipe 26. The buffer end 22a, pump end 22b, pipe coupler 22d and pump intake 20a couple using either traditional pressure fittings, clips or slots where complementary mating structures are used to removably couple the parts together. In a preferred embodiment, the mating structures are magnetic, and the buffer end 22a, pump end 22b, pipe coupler 22d and pump intake 20a are coupled using magnets or combinations of magnets and ferromagnetic materials.

Figure 10:
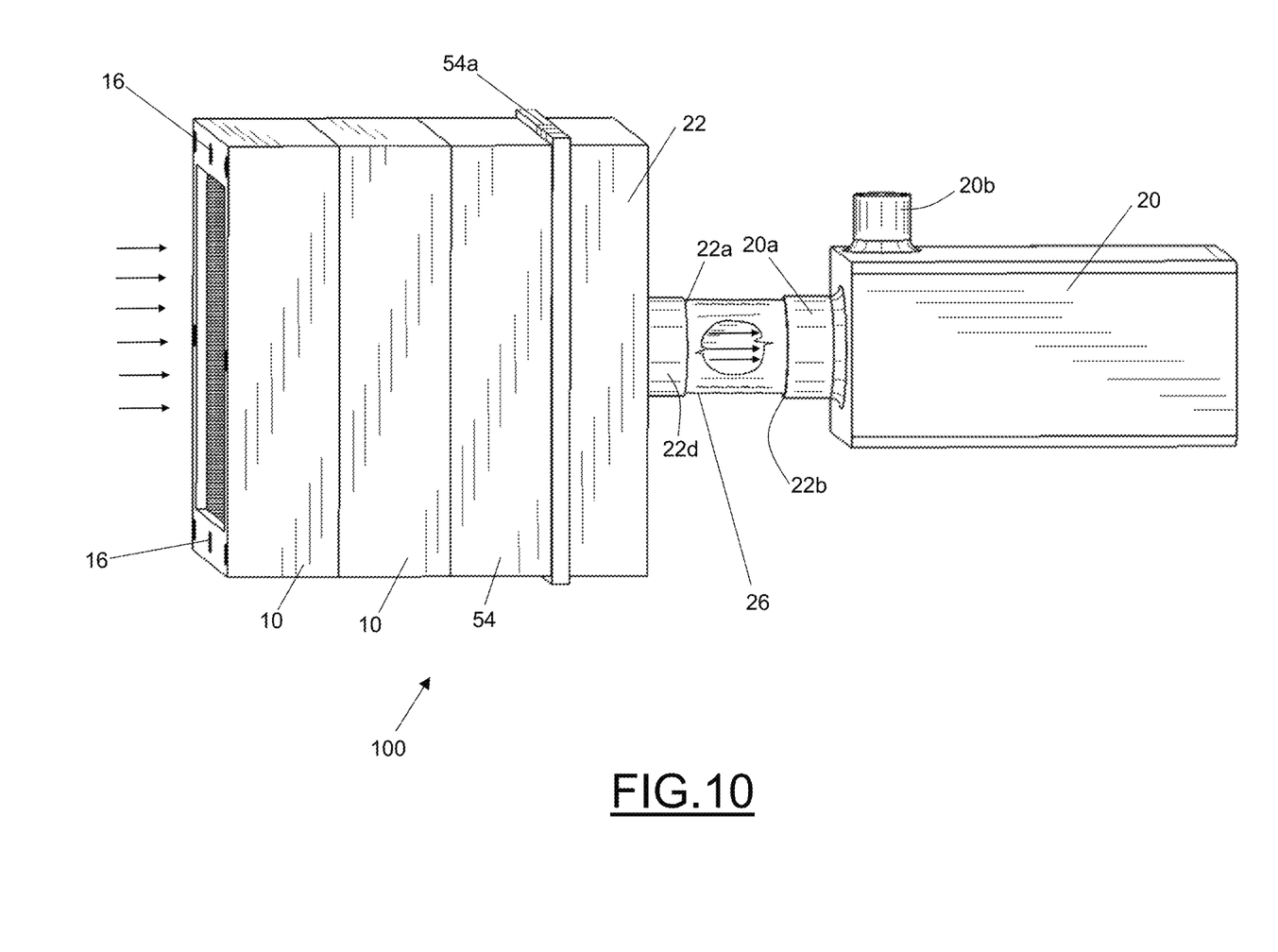
FIG. 10 shows the plurality of filter modules, buffer module and pump in FIG. 9 coupled together in a use position, with the water flow direction indicated as entering a front opening of a first filter module and moving through the coupled modules to the buffer module and then to the pump.
Figure 11:
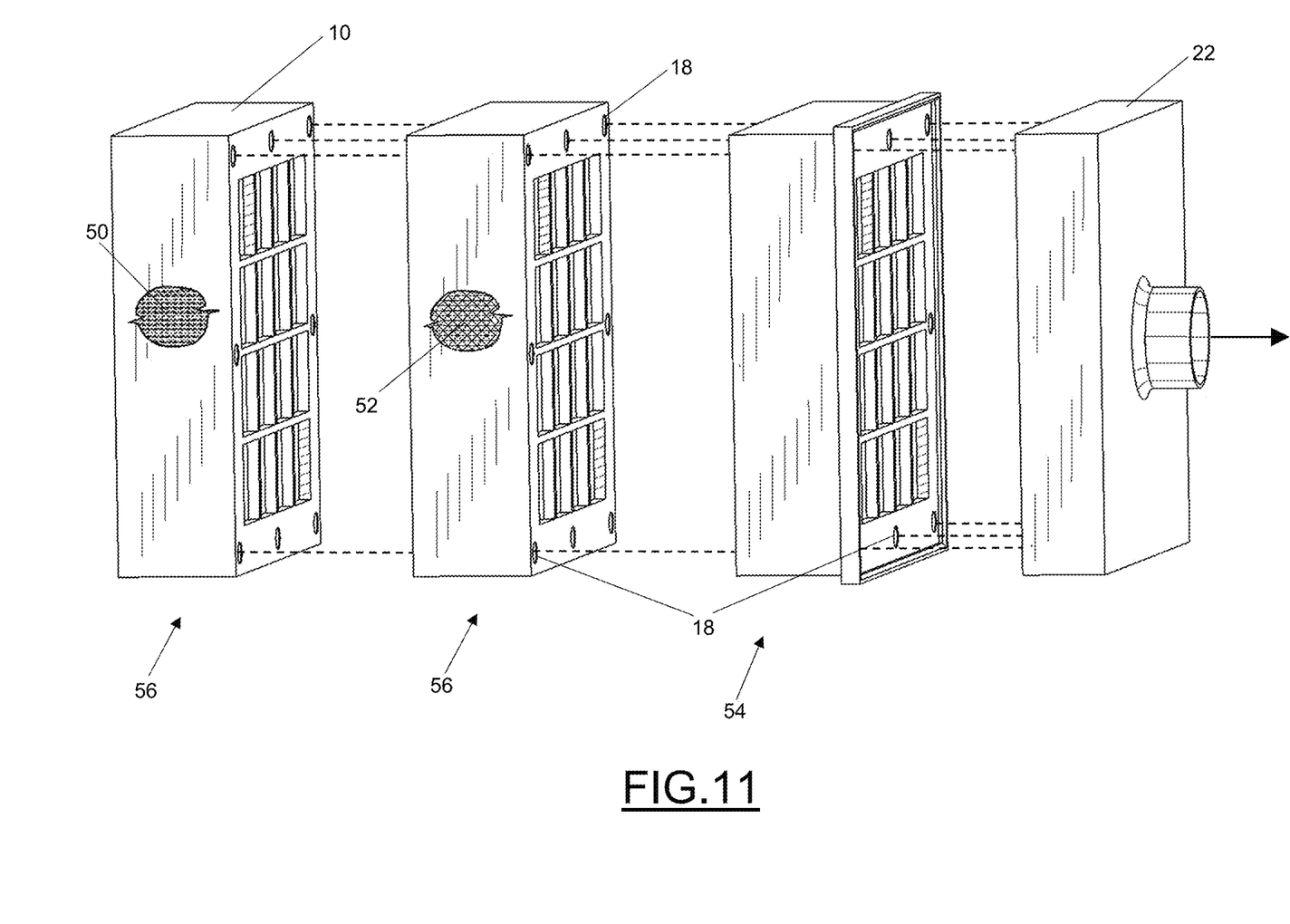
FIG. 11 is a second exploded view of the plurality of modules and the buffer module in FIG. 9, shown in a back perspective view.
Figure 12:
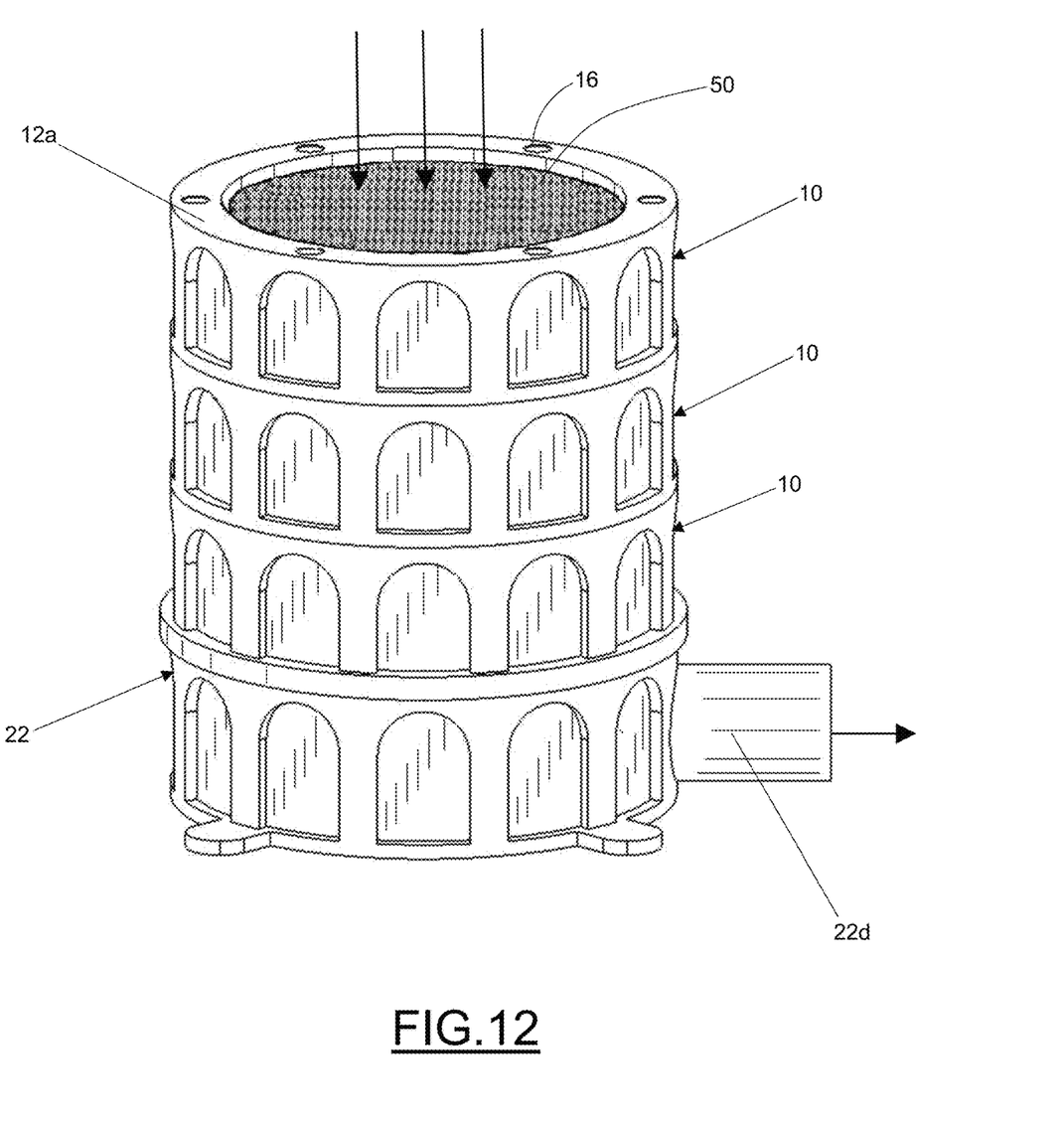
FIG. 12 is an ornamental embodiment of the representative arrangement in FIGS. 9-11, where an exterior of the modules feature an ornamental design approximating a tower building with floors, with the buffer module shown as a lowermost module simulating a bottom floor of the ornamental design. Arrows indicate water flow direction.

The inventor notes that the pipe coupler 22d in a second embodiment shown in FIG. 12 can also be positioned on a side wall of the module 10 when the modules 10 are stacked vertically thus the pipe coupler 22d does not have to be positioned on the buffer back 22f, nor does it have to be centrally located on the buffer back 22f as shown in the embodiment shown in FIGS. 1-11.

Figure 13:
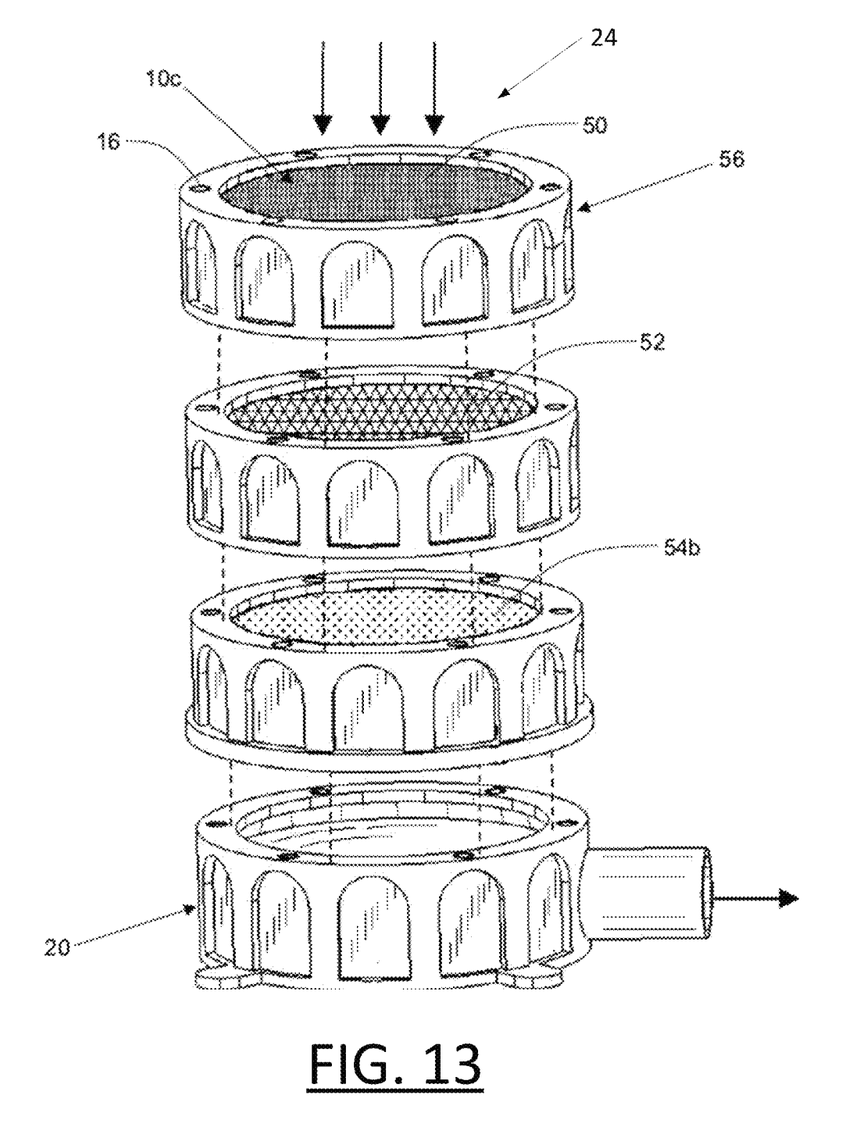
FIG. 13 is an exploded view of the ornamental embodiment in FIG. 12, where the lowermost module is the pump.
Figure 14:
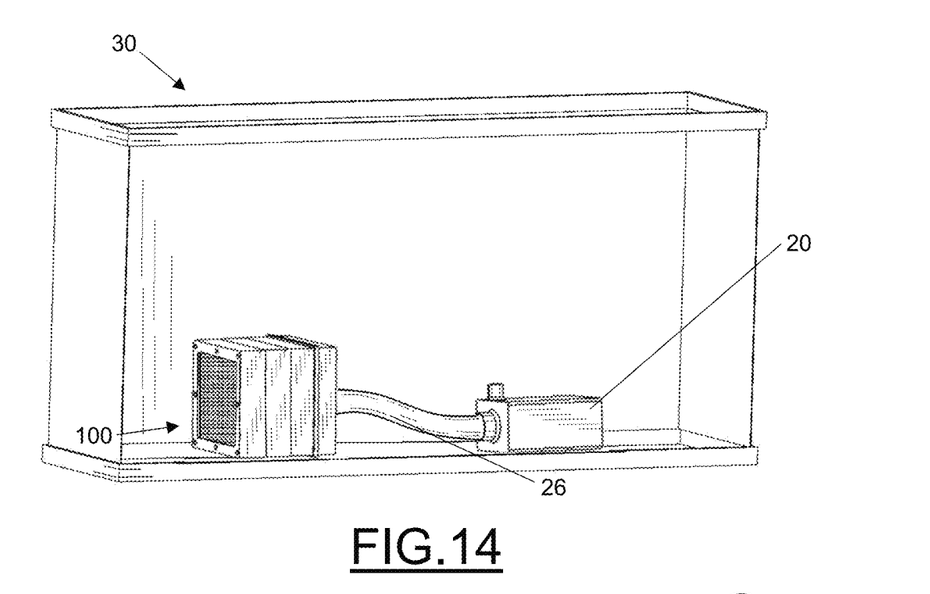
FIG. 14 is a representative embodiment of the invention shown with the filter modules, buffer module and pump all housed within a fish tank.
Figure 15:
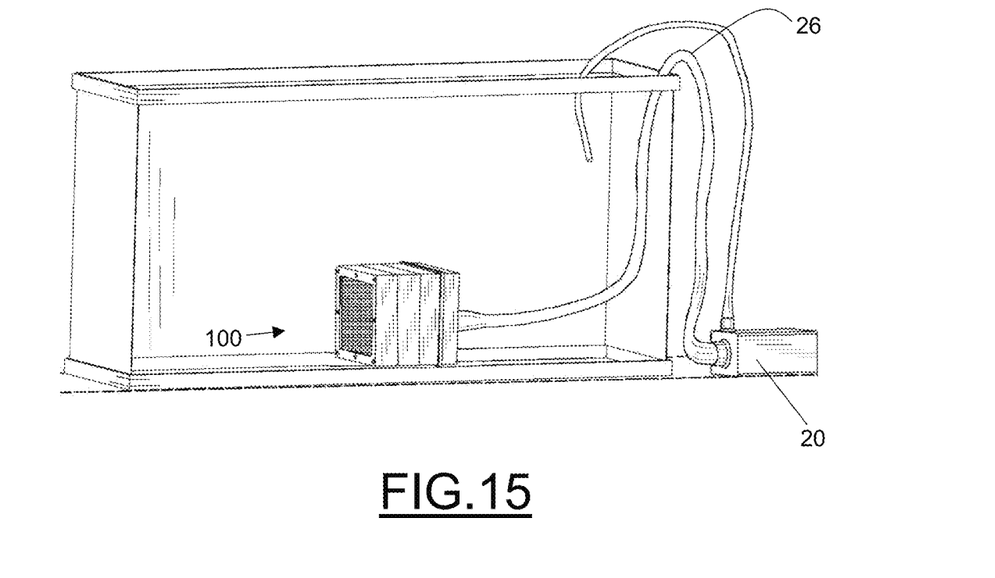
FIG. 15 is a representative embodiment of the invention shown with only the filter modules and buffer modules housed within the fish tank, and the pump housed outside of the fish tank.

The inventor notes that the representative embodiments shown in the FIGS. 1-12 include the buffer module 22 however the modular filter assembly 100 can be configured to eliminate the buffer module 22, and instead have the terminal module 54 attach directly to the pump 20 by incorporating the biological filter material 54b into the buffer module 22 or by using a snap-on buffer back 22f over the slotted back 14a of the module 10. In the representative embodiments shown, the buffer module 22 has no filter material and is typically used empty. The inventor also notes that the lip 54a on the terminal module 54 could in fact be incorporated into the front 22e of the buffer module 22 instead of into the terminal module 54 without affecting the functionality of the lip 54a. In FIG. 13, the pump 20 (not shown separately) is positioned inside an empty buffer module to further disguise the pump and filtration system as a decorative feature.

Figure 7:
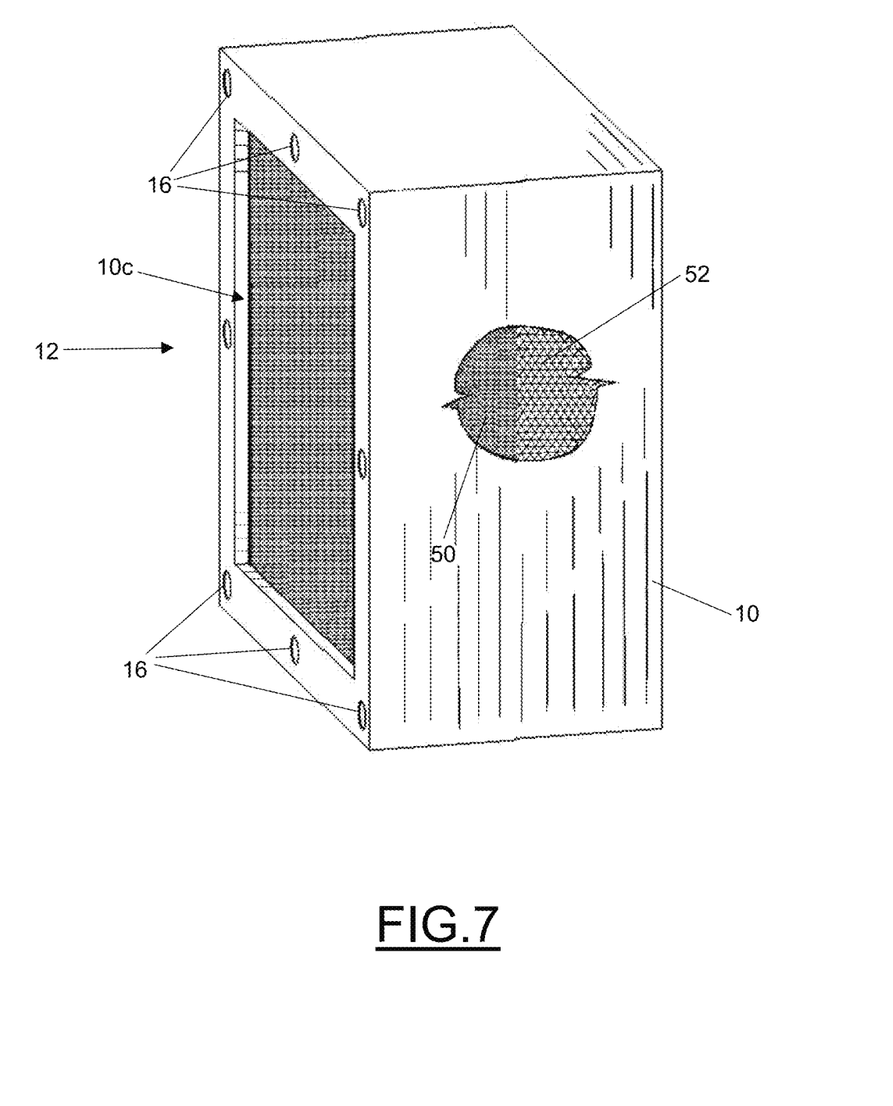
FIG. 7 is a second embodiment of the single filter module in FIG. 1, shown in a front perspective view and housing two different filter inserts within a same module.

When the first module 10 is positioned with its back 14 immediately adjacent the front 12 of the second module 10, the respective front and back couplers 16 18 removably mate and join the modules 10 together, and thus multiple modules 10 can be connected using the front-back couplers 16 18. The couplers 16 18 may be magnetic, mechanical or combinations thereof. The inventor notes that while modular filter assemblies are known in the prior art, there are none that teach a linear arrangement of identical, customizable modules to be used with the pump 20 as per the invention described herein, nor provide individual separate filter material modules that allow a user to organize the modules and their filter material inserts as desired. No prior art teaches magnetic coupling of identical, modular filter components in a tank filtration system either. The representative embodiments show mechanical filter modules 56 as having either or both a single coarse filter 50 and a fine filter 52 to remove particulate matter in the water, or separate individual filters such as a coarse filter 50 and a fine filter 52 housed within a single module as shown in FIG. 7, followed by a chemical filter 56 and/or the biological filter 54 prior to the filtered water being moved through the buffer module 22 and into the pump 20. Note that the modules 10 could easily be arranged so that the module housing the biological filter material 54b is positioned between the modules housing the mechanical filter materials 50 52, or multiple sets of mechanical filter materials 50 52 and chemical filter materials 58 could be included in the assembly 100, housed in separate modules or in a combination module as shown in FIG. 7. The buffer module 22 may be used empty, and thus serve as a true buffer module 22 or as an adaptor piece for coupling the assembly 100 to the pump 20 or as shown in FIG. 8, serve as a terminal filter module by including filter material such as chemical filter material 58 such as activated charcoal and ammonia-removing materials before water enters the pump 20. Water thus can be filtered multiple different ways through a variety of modules housing different filter materials, with the filter insert material selected for each module according to the needs of the fish in the tank 30.

One of the problems with the prior art is the removal or disturbance of the biological filter material 54b during routine tank cleaning of the mechanical and chemical portions of the filtration system, and thus the use of biological filter material 54b in the terminal module 54 with the lip 54a securing it to the buffer module 22 for instance ensures the module housing the biological filter materials 54b remains undisturbed while new mechanical and chemical filter materials 50 52 58 are substituted into their respective modules 10 in the filtration system during tank maintenance. Similarly, chemical filter material 58 can be easily removed from its respective module to prevent removal of medications or other water additions but maintain all other aspects of water filtration. The prior art teachers the use of combined chemical-biological-mechanical disposable inserts that do not allow for such customization, and the user is often faced with the option of having filtration or not having filtration. If the assembly 100 is moved to a larger tank, a larger pump can be substituted to replace an undersized one without disturbing the existing assembly 100 and additionally, a malfunctioning pump is easily replaced without disturbing the assembly 100. FIGS. 7-13 show examples of possible uses and arrangements of the modular filter assembly 100, with the option of positioning the pump 20 inside or outside the tank 30 (FIGS. 14-15), and also how each module 10 can be customized to use one or more filter materials (FIG. 7). In FIG. 13 for instance, the mechanical filter 56 is optimally positioned at an intake end 24 of the assembly 100 where the pump 20 sucks water into the front opening 10c and through the mechanical filter material 50 to prevent particles from clogging other filters, however, it should be noted that the order of the modules 10 is entirely up to the fish owner. In FIG. 11, modules housing separate mechanical and biological filter materials 50 52 54b are shown, however it should be noted that the type of filter material in each module 10 may serve many functions. For instance, it is common that a mechanical filter material 50 52 is made of carbon foam, which thus additionally serves as a chemical filter material 58. Also, popular biological filter material 54b such as ceramic rings may in fact also provide some chemical filtration if the rings include ammonia removing material, and some mechanical filtration materials such as foam can also serve as effective biological filter materials for the tank 30.

In FIG. 10, the pump 20 is coupled to the buffer module 22 by the pipe 26, ideally magnetically coupling to the buffer pipe end 22a of the buffer module 22 and to a pump end 22b of the pump 20, replacing a prior art method of threaded or pressure fitted parts connecting components of the filtration system. The buffer module 22 and a plurality of filter modules 10 in the representative embodiments shown are each formed with a series of magnetic couplers 16 18, shown as two sets of three magnetic couplers on the upper end 10a and the lower end 10b of each module 10, and on the front 12 and back 14 of each module 10, allowing the modules 10 54 22 to magnetically couple to one another. The couplers 16 18 are ideally arranged so as to be on opposite sides of the front and on the back, hence positioning the couplers 16 18 along opposite sides of the front 12 is also acceptable. The inventor notes however that positioning the couplers 16 18 along all four sides of the front flange 12a and along the back 14 is another optional configuration as this would allow the modules to be quickly and easily mated together when positioned adjacent one another and without the need to align the couplers 16 18 to facilitate the mating of the modules. The inventor notes that a simple twisting action is sufficient to break the magnetic couple. The front flange 12a, in another embodiment, can also be configured so as to partially constrict the front opening 10c and be positioned on opposed sides of the front 12. For instance, in FIG. 1, the front flange 12a could alternatively be configured to be just along the top end 10a and the bottom end 10b of the module 10, rather than along the entire perimeter of the front 12, and similarly, the front flange 12a could also be on opposed left and right sides of the front 12 and not on the top end 10a and bottom end 10b. For the embodiment shown in FIGS. 12-13, the front flange 12a could again be the entire perimeter of the front 12 as shown, or simply be configured as tabs that constrict the front opening 10c with a size and shape sufficient to support the front couplers 16. The front flange 12a as shown in the representative embodiments in the FIGS. supports both the front couplers 16 and also maintains the position of the filter insert material housed within the module 10, however, the inventor notes that small tab-like flanges constricting the front opening 10c would also tend to hold the filter insert material within the module 10 to a sufficient degree that when routine maintenance is done, the filter insert material does not fall out of the module 10 when the module 10 is removed from the assembly 100 in the tank 30. The inventor notes that the front flange 12a is primarily supporting the front couplers 16 and that the water direction and pressure caused by the pump pulling water into the assembly 100 is sufficient to prevent the filter insert material from repositioning. The inventor notes that mechanical male-female coupling structures will also work, as would clips and other coupling means.

When magnets are used, the couplers 16 18 could be opposite north-south pole magnets, or a mix of magnets and ferromagnetic material. Hence, in some embodiments, the magnetic couplers are magnet-counter magnet parts, in others, magnets and ferromagnetic metallic pieces are used as couplers, and combinations thereof can be used. The inventor notes however that the magnetic couplers shown in the representative embodiments in the FIGS. could further be configured as a band or bar across opposed ends or sides of each of the front 12 and back 14 of the module 10, or on the top end and the bottom end, etc., or a single coupler in each corner of the front 12 and back 14 of each module 10. Thus, the arrangement of the front and back couplers 16 18 in the FIGS. is representative only and not meant to limit the arrangement to what is shown.

The inventor notes that when the assembly 100 is submerged in water, as is the design of the representative embodiment in the FIGS., when magnets and/or ferromagnetic material are used as couplers 16 18, the couplers 16 18 are coated to protect against corrosion or damage by water, however, the magnetic coupling system works equally well for tank filtration systems that hang on an exterior of the tank 30 and water is effectively moved out of the tank 30, into the assembly 100, and then back into the tank 30.

The use of a magnetic coupling system for the filtration system components must be easily disengaged for cleaning or other maintenance. The inventor notes that classic male-female coupling can also be suitable for his invention, and in both cases, whether magnetic or mechanical coupling of the modules, the water flow direction, shown in FIGS. 10 and 12, creates sufficient pressure to keep the coupled modules together while in use in the tank, allowing use of relatively weak magnets or relatively weak mechanical coupling for the coupling system, that are otherwise unsuitable for use with prior art filtration systems. In this disclosure "relatively weak" means that if two modules are mated together, the mating means is insufficient to hold the modules together when the modules are used in a tank where water is pulled through the modules as opposed to pushed through the modules. "Relatively weak" is also a comparison of the mating power of the couplers 16 18 in the assembly 100 as compared to the prior art teaching, where components are snuggly pressured-fitted or threaded together. A water intake pipe for a prior art filter system must be pressure fitted into a special slot to prevent the moving water from dislodging the intake pipe. In the prior art, water flowing into the filter moves in an L-shaped path as it flows into a chamber into which the filter materials (biological, chemical and mechanical) are disposed on a frame firmly pressure fitted into a slot within the chamber, as the force of the water passing through this chamber and through the filter would otherwise push the filter out of the chamber. Hence, the components of a prior art filter must be firmly secured within the filter structure. Fully submerged tank filters usually are comprised of a housing inside which all filter materials are housed, with the water forced through the housing. The only way to perform maintenance on such filters is to take the entire system apart, disturbing the biological components, and notably, the finite space within the housing limits any ability to customize the filter materials or order in which the water is filtered through such materials.

In contrast, the unique linear, modular design of the assembly 100 uses the force of the water being sucked into the assembly 100 by the pump 20 to assist the couplers 16 18 holding the modules 10 54 22 together thus permitting a relatively weak mechanical and/or magnetic coupling system to be used. The relatively weak coupling system reduces the force required to detach the modules during routine maintenance, and thus prolonging the longevity of the modules. Currently in the prior art, pressure-fitted or threaded filter components are standard, and years of use plus exposure to light, water, and salt damages the components and ultimately results in breakage or failure of such components. The use of magnetic coupling or of relatively weak mechanical coupling, such as simple peg-hole arrangements thus extends the life of the filtration system by avoiding the forceful physical manipulation of the components that so often in the prior art causes those components to crack or otherwise fail.

The modules 10 22 54 shown are rectangular or cylindrical in the representative embodiments, however the inventor stresses that they can be any shape so long as they suit the purpose of the application. In FIGS. 12-13, an ornamental embodiment of the modular filter components is shown as a cylindrical tower with each module 10 22 54 and even the pump 20 disguised as an additional floor of the tower. The inventor notes that current filter systems seek to be visually minimalist in design and are often black to blend into the tank background, however the inventor's ornamental exterior of the modules 10 22 54 disguises the true nature of the structure as a design element of the tank 30 and thus offers functional filtration of water that is visually attractive.

Use of magnetic or weak mechanical coupling systems further allow for quick and easy modification of the assembly 100, speeding up maintenance and reducing filter downtime. The inventor notes that the number and order of the modules 10 and even the use of the buffer module 22 can be altered as desired by the fish owner, and the assembly 100 thus can be scaled up or down by easily swapping in new parts, including the pump 20, to increase or decrease water filtration rate, or to provide specialized filtration needs.

It is to be understood that the above-described arrangements are only illustrative of the application of the principles of the present invention. Numerous modifications and alternative arrangements may be devised by those skilled in the art without departing from the scope of the present invention. For instance, the front and back couplers 16 18 shown in the FIGS. are in fact magnetic, however any other coupling systems could be used, such as minimally pressure fitted couplers, hook and loop, rail and channel systems, etc. The inventor stresses that relatively weak coupling systems that are not currently useful in the prior art may be well adapted for use with his invention.

The inventor notes that current modular filtration systems are typically arranged as a single housing into which the various modular filtration components are removably inserted, and most often the filter material is preselected and the order of filtration is predetermined by the filter manufacturer and not the fish owner. The inventor is unaware of any filtration system that allows a same degree of modularity as his assembly 100, with or without pressure fitted coupling of the components. The FIGS. show what the inventor believes is an optimal coupling system using magnets but notes that pressure fitted rails or pegs are easy adaptations of the optimal system shown. The inventor stresses that the invention is primarily a modular filtration system where the individual filter components can be selected and easily assembled to best suit the needs of the particular application. This modular design, with its linear modularity, is easy to use and endlessly customizable. Modules are easily removed, cleaned and replaced, as needed and with limited down time, disruption, and stress to tank fish.

I claim:

1. A modular filtration assembly for a fish tank, comprising:

A first module having a front and a slotted back in spaced apart relationship defining a filter chamber, the front and back of the module defined by a perimeter;

wherein the slotted back is further comprised of a plurality of slots sized and shaped to allow water to flow into the front opening and exit the slotted back;

a front coupler affixed to the front and a back coupler affixed to the back of the first module;

a front opening formed into the front of the first module; and a buffer module having a buffer front and a buffer back, the buffer back formed with a pipe coupler;

wherein the back coupler couples to the front coupler when the back of the first module is positioned immediately adjacent the buffer front;

wherein the filter chamber is adapted to receive a quantity of filter material selected from the group of filter materials consisting of chemical, biological, and mechanical materials and materials combining two or more mechanical, biological and chemical filtering functions through the front opening;

wherein coupling the first module to the buffer module has a predetermined coupling strength insufficient to withstand water pushed through the first module and buffer by a pump; and wherein the predetermined coupling strength is sufficient to maintain the coupling of the first module to the buffer module when water is pulled through the first module and the buffer by the pump.

2. The modular filtration assembly in claim 1, further comprising:

a second module having a front coupler and a back coupler; and wherein the back coupler of the first module is adapted to removably couple to the front coupler of the second module.

3. The modular filtration assembly in claim 1, wherein the front is further comprised of a front flange formed around at least a portion of the perimeter, the front flange sized and shaped to support the front coupler.

4. The modular filtration assembly in claim 2, wherein the front further comprises a top end and a bottom end, and wherein the front flange is positioned on the top end and the bottom end of the front.

5. The modular filtration assembly in claim 2, wherein the front is further comprised of a pair of opposed sides and the front flange is positioned on the pair of opposed sides.

6. The modular filtration assembly in claim 2, wherein the first module, the second module, or both the first module and the second module is further comprised of an L-shaped lip extending away from the slotted back so as to create a recessed area sized and shaped to mate with the front of the first module, the second module or the buffer front.

7. The modular filtration assembly in claim 2, wherein the first module and the second module are each formed with a projecting collar along at least a portion of the perimeter of each of the first module and the second module such that when the first module and the second module are coupled together, the projecting collars are immediately adjacent one another.

8. The modular filtration assembly in claim 7, wherein the projecting collars are removably joined together by a pressure-fitted clip.

9. The modular filtration assembly in claim 2, wherein an exterior of the first module, the buffer module and the second module are a same shape and dimension.

10. The modular filtration assembly in claim 2, wherein the second module is a biological filter.

11. The modular filtration assembly in claim 1, wherein the front coupler is a magnet or a ferromagnetic metal.

12. The modular filtration assembly in claim 11, wherein the back coupler is a counter-magnet having an opposite polarity to the magnet of the front coupler or a ferromagnetic material when the front coupler is a magnet.

13. The modular filtration assembly in claim 1, wherein the pump is magnetically coupled to the buffer module.

14. The modular filtration assembly in claim 1, wherein the chamber is sized and shaped to receive at least two filter materials.

15. The modular filtration assembly in claim 1, wherein the first module and the buffer module are made of plastic.

16. The modular filtration assembly in claim 1, wherein the front coupler and the back coupler are male-female mechanical couplers.

* * * * *